United States Patent
Yoshitoku et al.

(10) Patent No.: US 7,357,970 B2
(45) Date of Patent: Apr. 15, 2008

(54) OPTICAL RECORDING MEDIUM

(75) Inventors: Daisuke Yoshitoku, Tokyo (JP); Koji Mishima, Tokyo (JP); Kenji Yamaga, Tokyo (JP); Hitoshi Arai, Tokyo (JP)

(73) Assignee: TDK Corporation, Tokyo (JP)

( * ) Notice: Subject to any disclaimer, the term of this patent is extended or adjusted under 35 U.S.C. 154(b) by 478 days.

(21) Appl. No.: 11/012,336

(22) Filed: Dec. 16, 2004

(65) Prior Publication Data

US 2005/0164040 A1 Jul. 28, 2005

(30) Foreign Application Priority Data

Dec. 17, 2003 (JP) .......................... P. 2003-419636

(51) Int. Cl.
*B32B 3/02* (2006.01)
(52) U.S. Cl. .................. 428/64.1; 428/64.4; 428/64.5; 430/270.12
(58) Field of Classification Search ............... 428/64.1, 428/64.4, 64.5; 430/270.12
See application file for complete search history.

(56) References Cited

U.S. PATENT DOCUMENTS 6,599,604 B2 * 7/2003 Chou et al. ................ 428/64.1
2006/0250916 A1 * 11/2006 Kikukawa et al. ........ 369/59.11

FOREIGN PATENT DOCUMENTS

| JP | 62-204442 | | 9/1987 |
|----|-----------|---|--------|
| JP | 3-114778 | | 5/1991 |
| JP | 4-105986 | * | 4/1992 |
| JP | 9-156224 | | 6/1997 |
| JP | 2004-87073 | | 3/2004 |

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

An optical recording medium comprising: a substrate 11; and a recording layer 12, formed on substrate 11; and characterized in that recording layer 12 contains palladium oxide as the main component and contains oxygen at an amount of 19 atom % to 61 atom %.

5 Claims, 3 Drawing Sheets

OPTICAL RECORDING MEDIUM

BACKGROUND OF THE INVENTION

This invention relates to a write-once type recordable optical recording medium, and particularly, to an optical recording medium that enables the improvement of reliability with respect to long-term storage, the reduction of manufacturing cost, and the recording of data and reproduction of recorded data as desired.

Conventionally, optical recording media such as CDs and DVDs have been used widely as recording media for recording digital data. And, in recent years, next-generation optical recording media that are higher in capacity and higher in data transfer rate are being developed actively.

Such optical recording media can be classified largely into ROM type optical recording media such as CD-ROM and DVD-ROM with which neither additional writing nor rewriting of data can be performed, write-once type optical recording media such as CD-R and DVD-R, with which, though additional writing of data is enabled but the rewriting of data is not enabled, and rewritable optical recording media such as CD-RW and DVD-RW, which enable the rewriting of data.

As is widely known, generally with a ROM type optical recording medium, data are recorded by bits that are formed on the substrate in the manufacturing stage, and with a rewritable optical recording medium, for example, a phase transition material is used as a material of a recording layer and data are generally recorded using a change of optical characteristics based on a change of the phase state.

Also, with a write-once type optical recording medium, a cyanine-based dye, phthalocyanine-based dye, azo dye, or other organic material is used as a material of a recording layer, and data are generally recorded using a change of optical characteristics based on a chemical change, physical change, or both types of change of the organic material.

However, an organic dye may undergo degradation due to illumination of sunlight, etc., and in the case where an organic dye is used as a material of a recording layer, the reliability with respect to long-term storage cannot be improved readily. Thus for improvement of reliability with respect to long-term storage, the use of materials besides organic dyes is required. As an example of an arrangement of a recording layer in which a material besides an organic dye is used to satisfy this requirement, the arrangement described in Japanese Patent Pubilication JP-A-62-204442 is known.

With a write-once type optical recording medium described in this document, a single recording layer is arranged by laminating two inorganic material films, and by illuminating a laser beam, elements that are contained as the main components in the two inorganic material film layers become mixed and eutectic crystallization is made to occur in this mixing process. When the materials of the two laminated inorganic material films are thus mixed to cause eutectic crystallization, the region that undergoes eutectic crystallization becomes different from other regions in optical characteristics, and this phenomenon can be used to perform data recording.

Meanwhile for further increase of the storage capacity, write-once type optical recording media, wherein two or more recording layers are laminated across intermediate layers, have come to be proposed in recent years.

With such an optical recording medium, a laser beam is focused onto any one of the recording layers, and by the laser beam that is set to a recording power Pw being illuminated on the recording layer, data are recorded by the forming of a record mark on a predetermined portion of the recording layer.

Meanwhile, when data that have been recorded in a recording layer are to be reproduced, a laser beam is focused onto the recording layer in which the data have been recorded, and the data are reproduced by the illumination of the laser beam that is set to a reproduction power Pr on the recording layer and the detection of the light amount of the laser beam from the recording layer.

With the write-once type optical recording medium described in JP-A-62-204442, improvement of the reliability with respect to long-term storage is possible. Since two inorganic material films are laminated and the mixing of these two inorganic material films is used to record data, two recording films are required to form a single recording layer. Thus, the manufacturing cost of the optical recording medium becomes high.

Also, with the write-once type optical recording medium described in JP-A-62-204442, since the difference in optical characteristics is not large between a record mark, which is formed by the mixing and eutectic crystallization of two inorganic material films, and other regions, it is difficult to record data in a manner by which reproduction signals of good signal characteristics can be obtained.

These issues also arise with write-once type optical recording media in which two or more recording layers are laminated across intermediate layers. In particular with write-once type optical recording media in which two or more recording layers are laminated, since the cost of manufacturing an entire optical recording medium increases in accordance with the number of recording layers, the development of a recording layer with a simple structure that enables the obtaining of reproduction signals with good signal characteristics was desired.

Also, with a write-once type optical recording media in which two or more recording layers are laminated, when data are to be recorded in or recorded data are to be reproduced from a recording layer at a far side of a light incidence surface, a laser beam must be illuminated onto the recording layer at the far side of the light incidence surface via recording layers closer to the light incidence surface. The recording layers that are closer to the light incidence surface are required to have the characteristics of being high in transmittance with respect to the laser beam and being such that the transmittance with respect to the laser beam does not change greatly before and after the forming of a record mark.

Thus regardless of there being just one recording layer or a plurality of recording layers, the development of an optical recording medium, which enables the improvement of reliability with respect to long-term storage, the reduction of manufacturing cost, and the recording of data and reproduction of recorded data as desired, was demanded strongly.

SUMMARY OF THE INVENTION

Thus an object of this invention is to provide an optical recording medium that enables the improvement of reliability with respect to long-term storage, the reduction of manufacturing cost, and the recording of data and reproduction of recorded data as desired.

The object is achieved by an optical recording medium, including: a substrate; and a recording layer formed on the substrate, wherein the recording layer contains palladium oxide as the main component and contains oxygen at an amount of 19 atom % to 61 atom %.

According to the present invention, when the recording layer is formed so as to contain palladium oxide as the main component and contain oxygen at an amount of 19 atom % to 61 atom %, the recording sensitivity of recording data in the recording layer can be improved, and thus data can be recorded as desired in the recording layer.

Further, when the recording layer is formed to have the above-described composition, reproduction signals of good signal characteristics can be obtained when data recorded in the recording layer are reproduced. Thus by the present invention, data recorded in the recording layer can be reproduced as desired.

Research by the present inventor has furthermore shown that when the recording layer is formed to have the above-described composition, the degradation of data recorded in the recording layer can be prevented, and thus by the present invention, the reliability of the optical recording medium with respect to long-term storage can be improved.

Since with the recording layer that is formed to contain palladium oxide as the main component and contain oxygen at an amount of 19 atom % to 61 atom %, the requirements of enabling the improvement of reliability with respect to long-term storage, and enabling the recording of data and reproduction of recorded data as desired can thus be satisfied by a single recording film, the manufacturing cost of the optical recording medium can also be reduced.

In a preferred embodiment of this invention, at least one dielectric layer is formed adjacent the above-mentioned recording layer. With the preferred embodiment of this invention, the noise contained in the reproduction signal can be reduced and reproduction signals of good signal characteristics can be obtained.

In a more preferred embodiment of this invention, a reflecting layer is formed between the above-mentioned substrate and the above-mentioned recording layer. With the more preferred embodiment of this invention, the noise contained in the reproduction signal can be reduced further and reproduction signals of even better signal characteristics can be obtained.

In a preferred embodiment of this invention, the above-mentioned recording layer is laminated in plurality across at least intermediate layers on the above-mentioned substrate, and at least one of the recording layers, besides the recording layer furthest from a light incidence surface for a laser beam, contains palladium oxide as the main component and contains oxygen at an amount of 37 atom % to 61 atom %.

In a case where a plurality of recording layers are laminated across at least intermediate layers, when data are recorded in or when recorded data are reproduced from a recording layer that is at far side of the light incidence surface, since a laser beam must be illuminated onto the recording layer at the far side of the light incidence surface via recording layers closer to the light incidence surface, the recording layers that are closer to the light incidence surface are required to have the characteristics of being high in transmittance with respect to the laser beam and being such that the transmittance with respect to the laser beam does not change greatly before and after the forming of a record mark.

Research by the present inventor has shown that when recording layers are formed so as to contain palladium oxide as the main component and contain oxygen at an amount of 37 atom % to 61 atom %, the recording layers can be improved in the transmittance of the laser beams and the recording layers can be made small in the change of transmittance of the laser beams before and after the recording of data.

Thus by this invention, since the lowering of the power of a laser beam, upon transmission of the laser beam through recording layers close to the light incidence surface, can be minimized, and the change, before and after the recording of data in recording layers close to the light incidence surface, of the light amount of a laser beam that is illuminated onto a recording layer at a far side of the light incidence surface can be minimized, data can be recorded in and recorded data can be reproduced as desired from a recording layer that is at a far side of the light incidence surface.

Research by the present inventor has also shown that when the recording layers are formed to have the above-described composition, the recording sensitivity of recording data in the recording layers can be improved, and thus by the present invention, data can be recorded in and recorded data can be reproduced as desired from not just a recording layer that is at far side of the light incidence surface but also a recording layer close to the light incidence surface.

With this invention, the recording layer is preferably formed so as to contain oxygen at an amount of 49 atom % to 61 atom %.

In a more preferred embodiment of this invention, at least one dielectric layer is formed adjacent at least one of the recording layers besides the recording layer furthest from the light incidence surface for the laser beam.

In a more preferred embodiment of this invention, the recording layer furthest from the light incidence surface for the laser beam comprises a first recording film, containing Cu as the main component, and a second recording film, containing Si as the main component.

In a more preferred embodiment of this invention, a reflecting layer is formed between the above-mentioned recording layer furthest from the light incidence surface for the laser beam and the above-mentioned substrate.

In a more preferred embodiment of this invention, the above-mentioned recording layer is arranged for the recording of data and the reproduction of recorded data using a laser beam with a wavelength of 380 nm to 450 nm.

Since this invention's recording layer exhibits good optical characteristics with a laser beam with a wavelength of 380 nm to 450 nm, data are preferably recorded and recorded data are preferably reproduced using a laser beam with a wavelength of 380 nm to 450 nm.

DETAILED DESCRIPTION OF THE PREFERRED EMBODIMENTS

Preferred embodiments of this invention shall now be described in detail based on the attached drawings.

Figure 1:
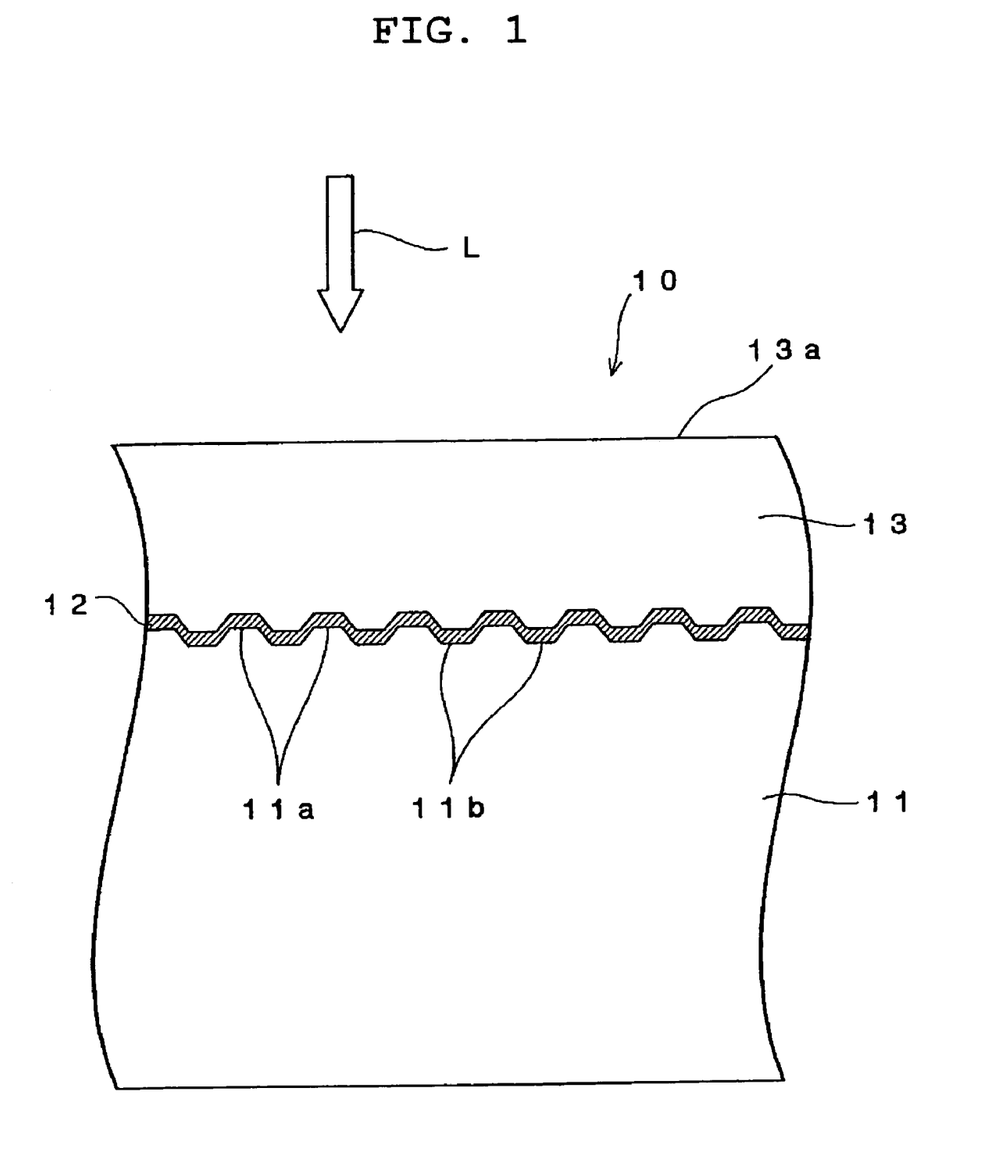
FIG. 1 is a schematic enlarged sectional view of an optical recording medium of a preferred embodiment of this invention.

FIG. 1 is a schematic enlarged sectional view of an optical recording medium 10 of a preferred embodiment of this invention.

Optical recording medium 10 of this embodiment is formed as a disk having an outer diameter of approximately 120 mm and a thickness of 1.2 mm, and as shown in FIG. 1, comprises a supporting substrate 11, a recording layer 12, and a light transmitting layer 13.

Supporting substrate 11 functions a supporting member for securing the mechanical strength required of optical recording medium 10.

The material for forming supporting substrate 11 is not restricted in particular as long as it can function as a supporting member for optical recording medium 10. Supporting substrate 11 may, for example, be formed of glass, ceramic, resin, etc. Among such materials, a resin is preferably used from the standpoint of ease of forming. Polycarbonate resin, acrylic resin, epoxy resin, polystyrene resin, polyethylene resin, polypropylene resin, silicone resin, fluororesin, ABS resin, urethane resin, etc., can be cited as examples of such a resin. Among these, a polycarbonate resin is especially preferable from the standpoint of processability, surface roughness, etc., and in the present embodiment, supporting substrate 11 is formed of a polycarbonate resin. With the present embodiment, since a laser beam L is illuminated across a light incidence surface 13a that is positioned at the opposite side of supporting substrate 11, supporting substrate 11 is not required to have a light transmitting property.

With the present embodiment, supporting substrate 11 has a thickness of approximately 1.1 mm.

Figure 2:
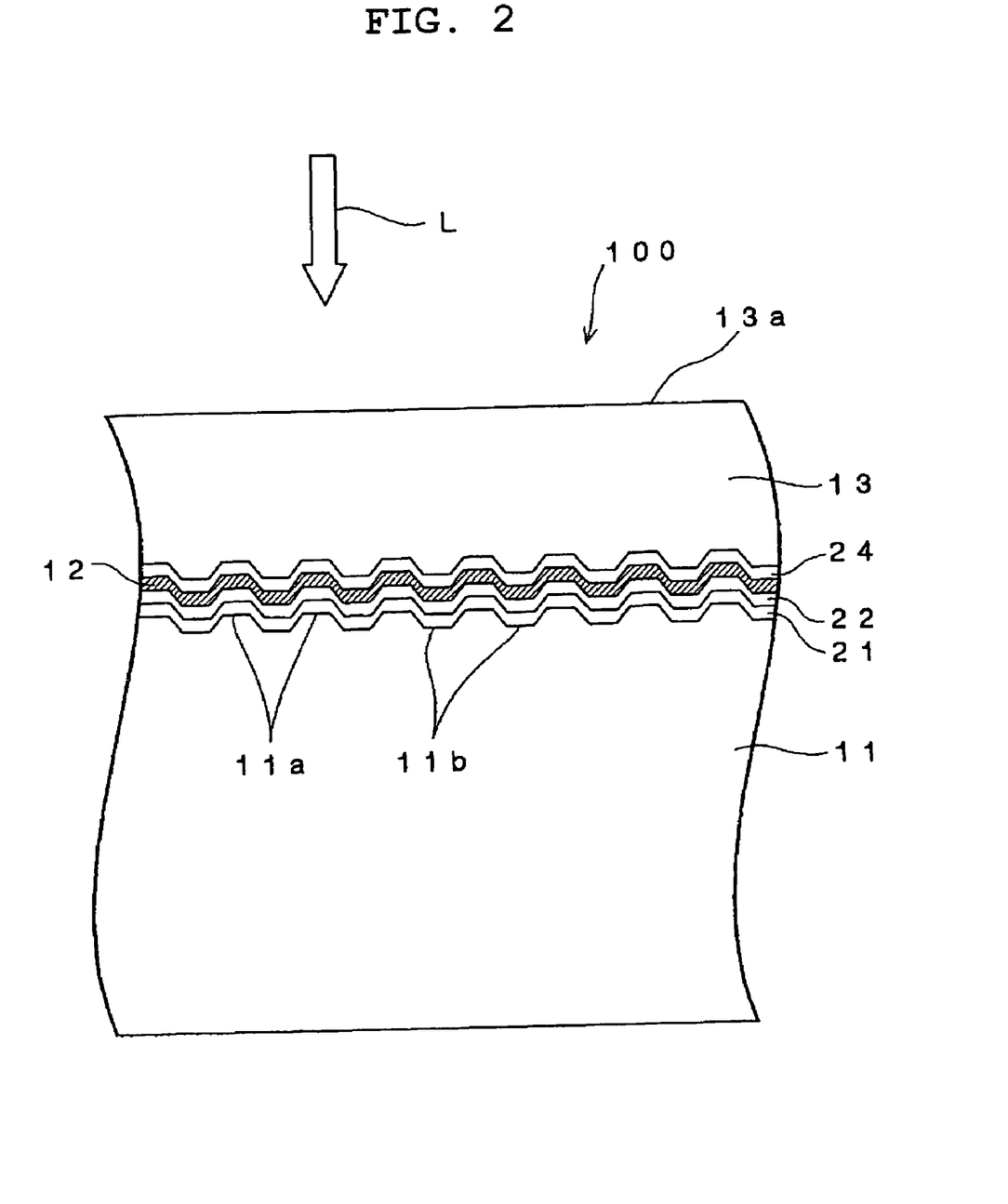
FIG. 2 is a schematic enlarged sectional view of an optical recording medium of another preferred embodiment of this invention.

As shown in FIG. 2, grooves 11a and lands 11b are formed alternately on a surface of supporting substrate 11. Grooves 11a and/or lands 11b that are formed on the surface of supporting substrate 11 function as guide tracks for laser beam L when data are recorded in and when data are reproduced from recording layer 12.

Though the depth of grooves 11a is not restricted in particular, it is preferably set in the range of 10 nm to 40 nm, and though the pitch of grooves 11a is not restricted in particular, it is preferably set in the range of 0.2 μm to 0.4 μm.

As shown in FIG. 2, recording layer 12 is formed on the surface of supporting substrate 11.

Recording layer 12 is the layer in which data are recorded and is constituted from a single recording film.

With the present embodiment recording layer 12 is formed so as to contain palladium oxide as the main component and contain oxygen at an amount of 19 atom % to 61 atom %. With the present specification, containing a certain element as the main component means that the content of this element is 50 atom % to 100 atom %.

Research by the present inventor has shown that when recording layer 12 is formed so as to contain palladium oxide as the main component and contain oxygen at an amount of 19 atom % to 61 atom %, the degradation of data recorded in recording layer 12 can be prevented, and thus by the present invention, the reliability of optical recording medium 10 with respect to long-term storage can be improved.

Recording layer 12 preferably has a thickness of 5 nm to 40 nm and more preferably has a thickness of 8 nm to 30 nm. When the thickness of recording layer 12 is less than 5 nm, an adequate reflectance may not be obtained, and on the other hand, it is not preferable for the thickness of recording layer 12 to exceed 40 nm since the film forming time will then become long and the productivity may degrade.

Recording layer 12 may be formed by a vapor-phase growth method, such as vacuum deposition, sputtering, etc.

As shown in FIG. 2, light transmitting layer 13 is formed on a surface of recording layer 12.

Light transmitting layer 13 is a layer that transmits laser beams, and light incidence surface 13a is arranged as one of its surfaces.

Light transmitting layer 13 is preferably formed to have a thickness of 10 μm to 300 μm and more preferably formed to have a thickness of 50 μm to 150 μm.

Though the material for forming light transmitting layer 13 is not restricted in particular, the use of an ultraviolet-curing resin that is acrylic-based or epoxy-based, etc., is preferable.

Light transmitting layer 13 may be formed by spin coating or by adhering on a sheet, formed of a light transmitting resin, using an adhesive agent.

Light transmitting layer 13 must have an adequately high light transmitting property since laser beam L is transmitted through it in the recording and reproduction of data.

Data are recorded in the following manner in optical recording medium 10 with the above-described arrangement.

In recording data in optical recording medium 10, laser beam L, with a wavelength λ in the range of 380 nm to 450 nm, is illuminated via light incidence surface 13a of light transmitting layer 13 and laser beam L is focused onto recording layer 12.

When laser beam L is illuminated on recording layer 12 in this manner, the palladium oxide, which is contained as the main component in recording layer 12, decomposes and recording layer 12 undergoes deformation. With the present embodiment, data are recorded by making use of the change of optical characteristics due to the decomposition of palladium oxide and the change of optical characteristics due to the deformation of recording layer 12.

With the present embodiment, recording layer 12 is formed so as to contain palladium oxide as the main component and contain oxygen at an amount of 19 atom % to 61 atom %, and research by the present inventor has shown that when recording layer 12 is formed to have the above composition, the recording sensitivity of recording data in recording layer 12 can be improved.

Though the reason as to why the recording sensitivity of recording layer 12 can be improved when recording layer 12 is formed so as to have the above composition is not necessarily clear, it is assumed that the above effect is due to the thermal conductivity being lowered and recording layer 12 consequently being enabled to be heated efficiently when recording layer 12 is made to contain palladium oxide as the main component and contain oxygen at an amount of 19 atom % to 61 atom %.

Thus with the present embodiment, data can be recorded as desired in recording layer 12.

Data that have been recorded in recording layer 12 are reproduced in the following manner.

In reproducing data recorded in optical recording medium 10, laser beam L, with a wavelength λ in the range of 380 nm to 450 nm, is illuminated via light incidence surface 13a of light transmitting layer 13 and laser beam L is focused onto recording layer 12.

When laser beam L is thus illuminated onto recording layer 12, laser beam L is reflected, and by detection of the light amount of the reflected laser beam L, data recorded in recording layer 12 are reproduced.

Research by the present inventor has shown that when recording layer 12 is formed so as to contain palladium oxide as the main component and contain oxygen at an amount of 19 atom % to 61 atom %, reproduction signals of good signal characteristics can be obtained when data recorded in the recording layer are reproduced. Thus by the present embodiment, data recorded in recording layer 12 can be reproduced as desired.

Since with recording layer 12 that is formed to contain palladium oxide as the main component and contain oxygen at an amount of 19 atom % to 61 atom %, the requirements of enabling the improvement of reliability with respect to long-term storage, and enabling the recording of data and reproduction of the recorded data as desired can be satisfied by a single recording film as described above, the manufacturing cost of optical recording medium 10 can also be reduced.

FIG. 2 is a schematic enlarged sectional view of an optical recording medium of another preferred embodiment of this invention.

As shown in FIG. 2, optical recording medium 100 of this embodiment is equipped with a supporting substrate 11, a reflecting layer 21, formed on a surface of supporting substrate 11, a second dielectric layer 22, formed on a surface of reflecting layer 21, a recording layer 12, formed on a surface of second dielectric layer 22, a first dielectric layer 24, formed on a surface of recording layer 12, and a light transmitting layer 13, formed on a surface of first dielectric layer 24, and besides reflecting layer 21 and second dielectric layer 22 being formed between supporting substrate 11 and recording layer 12 and first dielectric layer 24 being formed between light transmitting layer 13 and recording layer 12, the arrangement is the same as that of optical recording medium 10, shown in FIG. 1.

Reflecting layer 21 serves the role of reflecting a laser beam L that is made incident from a light incidence surface 13a and making the laser beam be re-emitted from light incidence surface 13a and also serves the role of effectively radiating the heat that is generated in recording layer 12 due to the illumination of laser beam L.

Reflecting layer 21 is not restricted in particular in regard to the material of which it is formed and may be formed of Mg, Al, Ti, Cr, Fe, Co, Ni, Cu, Zn, Ge, Ag, Pt, Au, etc. Among these, Al, Au, Ag, or an alloy of these has a high reflectance and a high thermal conductivity and is therefore preferably used for forming reflecting layer 21.

Reflecting layer 21 is preferably formed to have a thickness of 20 nm to 200 nm. When the thickness of reflecting layer 21 is less than 20 nm, it becomes difficult to make the reflectance of reflecting layer 21 adequately high and it becomes difficult for the heat generated in recording layer 12 to be radiated. On the other hand, when the thickness of reflecting layer 21 exceeds 200 nm, the productivity is decreased due to the requiring of a large amount of time for the film formation of reflecting layer 21 and there is also a tendency for cracks to form due to internal stress, etc.

First dielectric layer 24 and second dielectric layer 22 serve the roles of preventing heat deformation of supporting substrate 11 and protecting recording layer 12 physically and chemically.

The material for forming first dielectric layer 24 and second dielectric layer 22 is not restricted in particular as long as it is a dielectric material that is transparent in the wavelength range of laser beam L, and first dielectric layer 24 and second dielectric layer 22 may be formed, for example, of a dielectric material having an oxide, nitride, sulfide, fluoride, or combination of such as the main component. First dielectric layer 24 and second dielectric layer 22 are preferably formed of an oxide, nitride, sulfide, fluoride, or composite of these that contains at least one element selected from the group consisting of Si, Ge, Zn, Al, Ta, Ti, Co, Zr, Pb, Ag, Sn, Ca, Ce, V, Cu, Fe, and Mg. As the dielectric material for forming first dielectric layer 24 and second dielectric layer 22, a mixture of ZnS and $SiO_2$ is especially preferable, and the molar ratio of ZnS to $SiO_2$ is preferably in the range of 50:50 to 85:15 and more preferably approximately 80:20.

First dielectric layer 24 and second dielectric layer 22 may be formed by a vapor-phase growth method, such as vacuum deposition, sputtering, etc.

As described above, with the present embodiment, reflecting layer 21 and second dielectric layer 22 are formed between supporting substrate 11 and recording layer 12 and first dielectric layer 24 is formed between light transmitting layer 13 and recording layer 12, and research by the present inventor has shown that when optical recording medium 10 is arranged by providing reflecting layer 21 and sandwiching recording layer 12 by first dielectric layer 24 and second dielectric layer 22, the noise, contained in the reproduction signals when data recorded in recording layer 12 are reproduced, can be reduced.

Though the reason as to why the noise, contained in the reproduction signals when data recorded in recording layer 12 are reproduced, can be reduced by the forming of first dielectric layer 24 and second dielectric layer 22 is not necessarily clear, it is assumed that this is due to the prevention of recording layer 12 from becoming deformed more than necessary when data are recorded in recording layer 12 and also due to the prevention of the deformation of supporting substrate 11 and light transmitting layer 13 at the same time.

Thus by the present embodiment, reproduction signals of even better signal characteristics can be obtained.

Figure 3:
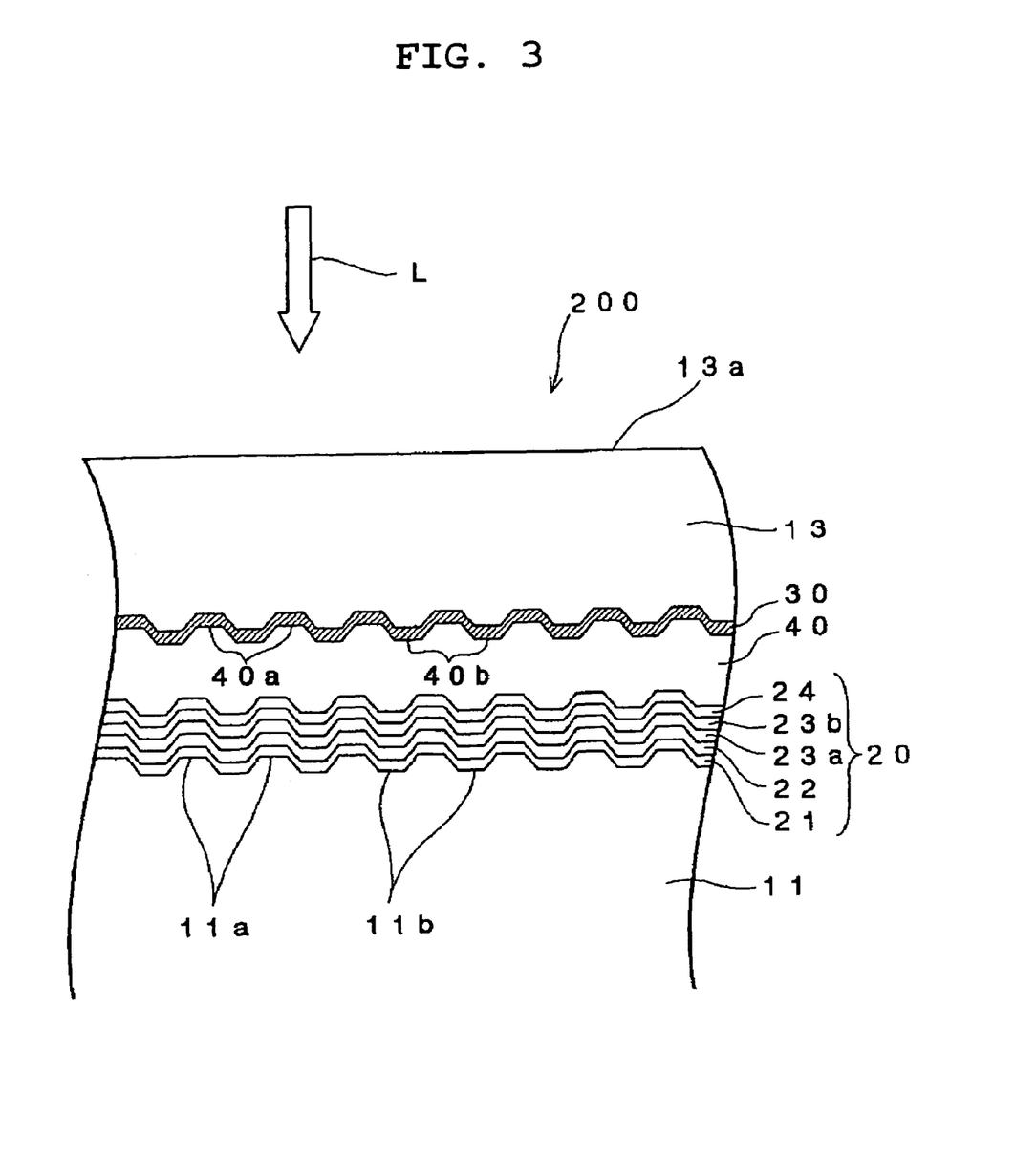
FIG. 3 is a schematic enlarged sectional view of an optical recording medium of yet another preferred embodiment of this invention.

FIG. 3 is a schematic enlarged sectional view of an optical recording medium of yet another preferred embodiment of this invention.

As shown in FIG. 3, optical recording medium 200 of this embodiment is equipped with a supporting substrate 11, a first recording layer 20, formed on a surface of supporting substrate 11, an intermediate layer 40, formed on a surface of first recording layer 20, a second recording layer 30, formed on a surface of intermediate layer 40, and a light transmitting layer 13, formed on a surface of second recording layer 30, and differs from optical recording medium 10, shown in FIG. 1, in that second recording layer 30 is formed across intermediate layer 40 above first recording layer 20 and two recording layers are thus formed.

As shown in FIG. 3, first recording layer 20 is equipped with a reflecting layer 21, formed on a surface of supporting substrate 11, a second dielectric layer 22, formed on a surface of reflecting layer 21, a first recording film 23a, formed on a surface of second dielectric layer 22, a second recording film 23b, formed on a surface of first recording film 23a, and a first dielectric layer 24, formed on a surface of second recording film 23b.

Reflecting layer 21, first dielectric layer 24, and second dielectric layer 22, shown in FIG. 3, are the same in arrangement as reflecting layer 21, first dielectric layer 24, and second dielectric layer 22, shown in FIG. 2.

Though first recording film 23a and second recording film 23b are recording films in which data are recorded, however, data cannot be recorded in each film solitarily and the role of a single recording layer is served by the two recording films being formed close to each other.

In the present embodiment, first recording film 23a contains Cu as the main component and second recording film 23b contains Si as the main component. To first recording film 23a, containing Cu as the main component, at least one element selected from among the group consisting of Al, Zn, Sn, Mg, and Au is preferably added. When such an element is added to first recording film 23a, the noise level of reproduction signals can be lowered and the reliability with respect to long-term storage can be improved.

First recording film 23a and second recording film 23b are preferably formed so that the total thickness thereof will be 2 nm to 40 nm. When the total thickness of first recording film 23a and second recording film 23b is less than 2 nm, the change of reflectance before and after illumination of laser light L will be low and reproduction signals of high C/N ratio cannot be obtained. On the other hand when the total thickness of first recording film 23a and second recording film 23b exceeds 40 nm, the recording sensitivity degrades.

Though the respective thicknesses of first recording film 23a and second recording film 23b are not restricted in particular, it is preferable for the ratio of the thickness of second recording film 23b to the thickness of first recording film 23a, that is, the thickness of second recording film 23b/thickness of first recording film 23a to be in the range of 0.2 to 5.0.

First recording film 23a and second recording film 23b may be formed by a vapor-phase growth method, such as vacuum deposition, sputtering, etc.

As shown in FIG. 3, intermediate layer 40 is formed on the surface of first recording layer 20.

Intermediate layer 40 has the function of spacing first recording layer 20 and second recording layer 30 apart by a distance that is adequate physically and optically.

As shown in FIG. 3, grooves 40a and lands 40b are formed alternately on the surface of intermediate layer 40. Grooves 40a and/or lands 40b that are formed on the surface of intermediate layer 40 function as guide tracks for laser beam L when data are recorded in second recording layer 30 and when data are reproduced from second recording layer 30.

Intermediate layer 40 is preferably formed so as to have a thickness of 5 µm to 50 µm and is more preferably formed so as to have a thickness of 10 µm to 40 µm.

Intermediate layer 40 must have a high transmittance since laser beam L passes through it. Though the material for forming intermediate layer 40 is not restricted in particular as long as it has a light transmitting property with respect to the laser beam, the use of an ultraviolet-curing acrylic resin is preferable.

As shown in FIG. 3, second recording layer 30 is formed on the surface of intermediate layer 40.

Second recording layer 30 is a recording layer in which data are recorded and is arranged from a single recording layer.

With the present embodiment, second recording layer 30 is formed so as to contain palladium oxide as the main component and contain oxygen at an amount of 37 atom % to 61 atom % and is preferably formed so that the oxygen content is 49 atom % to 61 atom %.

Second recording layer 30 preferably has a thickness of 5 nm to 40 nm and more preferably has a thickness of 8 nm to 30 nm.

Second recording layer 30 may be formed by a vapor-phase growth method, such as vacuum deposition, sputtering, etc.

With optical recording medium 200 with the above-described arrangement, data are recorded and recorded data are reproduced as follows.

With the present embodiment, in recording data in and reproducing recorded data from optical recording medium 200, laser beam L, with a wavelength λ in the range of 380 nm to 450 nm, is illuminated via light incidence surface 13a of light transmitting layer 13 and laser beam L is focused onto either first recording layer 20 or second recording layer 30.

When data are to be recorded in first recording layer 20, laser beam L, which has been set to a recording power Pw, is focused onto first recording layer 20 and illuminated onto first recording layer 20 via light transmitting layer 13.

When laser beam L, which has been set to recording power Pw, is illuminated on first recording layer 20, first recording layer 20 becomes heated, the element contained as the main component in first recording film 23a and the element contained as the main element in second recording film 23b become mixed, and a mixed region is thereby formed. Since this mixed region differs greatly from other regions in the reflectance with respect to laser beam L, it can be used as a record mark.

Meanwhile, to reproduce data that have been recorded in first recording layer 20, laser beam L, which has been set to a reproduction power Pr, is focused onto first recording layer 20. When laser beam L is thus illuminated onto first recording layer 20, laser beam L is reflected, and the data recorded in first recording layer 20 are reproduced by detection of the light amount of the reflected laser beam L.

When data are thus recorded in and recorded data are thus reproduced from first recording layer 20, laser beam L is illuminated on first recording layer 20 via second recording layer 30, and second recording layer 30 is therefore required to be high in transmittance with respect to laser beam L. Also, if the transmittance of second recording layer 30 with respect to laser beam L changes greatly before and after the recording of data in second recording layer 30, this will greatly affect the recording sensitivity of first recording layer 20 when data are recorded in first recording layer 20 and the signal characteristics of the reproduction signals when data recorded in first recording layer 20 are reproduced. Thus second recording layer 30 must also not change greatly in the transmittance with respect to laser beam L before and after the recording of data.

With the present embodiment, second recording layer 30 is formed so as to contain palladium oxide as the main component and to contain oxygen at an amount of 37 atom % to 61 atom %, and research by the present inventor has shown that when second recording layer 30 is formed to have this composition, the transmittance of second recording layer 30 with respect to laser beam L can be improved and the change of transmittance of second recording layer 30 with respect to laser beam L before and after the recording of data can be made small.

Thus with the present embodiment, since the lowering of the power of laser beam L upon passage of laser beam L through second recording layer 30 can be restrained to the minimum and since the change of the light amount of laser beam L that is illuminated on first recording layer 20 before and after data are recorded in second recording layer 30 can be restrained to the minimum, data can be recorded in and recorded data can be reproduced from first recording layer 20 as desired.

Also, to record data in second recording layer 30, laser beam L, which has been set to recording power Pw, is focused onto second recording layer 30 and illuminated on second recording layer 30 via light transmitting layer 13. As in the case of recording layer 12, shown in FIGS. 1 and 2, when laser beam L is thus illuminated on second recording layer 30, the palladium oxide that is contained as the main component in second recording layer 30 decomposes, second recording layer 30 undergoes deformation, and data are thereby recorded.

Meanwhile, to reproduce data that have been recorded in second recording layer 30, laser beam L, which has been set to reproduction power Pr, is focused onto second recording layer 30. When laser beam L is thus illuminated on to second recording layer 30, laser beam L is reflected and the data recorded in second recording layer 30 are reproduced by detection of the light amount of the reflected laser beam L.

Research by the present inventor has shown that when second recording layer 30 is formed so as to contain palladium oxide as the main component and contain oxygen at an amount of 37 atom % to 61 atom %, the recording sensitivity of second recording layer 30 can be improved and the signal characteristics of reproduction signals obtained by reproduction of data recorded in second recording layer 30 can be improved further. Thus by the present embodiment, data can be recorded in and recorded data can be reproduced from not just first recording layer 20 but also second recording layer 30 as desired.

Examples shall now be described to further clarify the effects of this invention.

EXAMPLES

Example 1

First, a polycarbonate substrate, having a thickness of 1.1 mm and a diameter of 120 mm and on which grooves and lands are formed at a groove pitch of 0.32 μm, was formed by injection molding.

The polycarbonate substrate was then set on a sputtering device, and under a mixed gas condition, wherein the flow rates of Ar and $O_2$ were set to 50 sccm and 2 sccm, respectively, sputtering was performed using a Pd target to form a recording layer, containing palladium oxide as the main component and having a thickness of 20 nm.

Lastly, an ultraviolet-curing acrylic resin was coated by spin coating to form a coating film on the surface of the recording layer and this was subject to ultraviolet ray illumination to form a light transmitting layer of 100 μm.

A Sample #1 was thus prepared.

A Sample #2 was prepared in the same manner as Sample #1 with the exception that the flow rates of Ar and $O_2$ in the mixed gas in the process of forming the recording layer were set to 50 sccm and 5 sccm, respectively.

A Sample #3 was prepared in the same manner as Sample #1 with the exception that the flow rates of Ar and $O_2$ in the mixed gas in the process of forming the recording layer were set to 50 sccm and 7 sccm, respectively.

A Sample #4 was prepared in the same manner as Sample #1 with the exception that the flow rates of Ar and $O_2$ in the mixed gas in the process of forming the recording layer were set to 50 sccm and 20 sccm, respectively.

A Sample #5 was prepared in the same manner as Sample #1 with the exception that the flow rates of Ar and $O_2$ in the mixed gas in the process of forming the recording layer were set to 10 sccm and 90 sccm, respectively.

A Comparative Sample #1 was prepared in the same manner as Sample #1 with the exception that the flow rates of Ar and $O_2$ in the mixed gas in the process of forming the recording layer were set to 50 sccm and 0 sccm, respectively.

A Sample #1-1 was then prepared by forming a recording layer with a thickness of 200 nm on the surface of a silicon substrate with a thickness of 0.5 mm under the same film forming conditions as those for forming the recording layer of Sample #1.

A Sample #2-1 to a Comparative Sample #1-1 were then prepared by forming a recording layer with a thickness of 200 nm on the surface of a silicon substrate under the same film forming conditions as those for forming the recording layers of Sample #2 to Comparative Sample #1, respectively.

Then using the fluorescence x-ray device, "RIX2000" (trade name), made by Rigaku Denki Kogyo Corp., the contents of the palladium and oxygen contained in the recording layers of Sample #1-1 to Comparative Sample #1-1 were measured by thin-film FP method upon generating X-rays with the tube voltage of an Rh tube being set to 50 kV and the tube current being set to 50 mA. Al was used as a primary X-ray filter, the Pd-Lα line was used as the characteristic X-ray of palladium, and the O-Kα line was used as the characteristic X-ray of oxygen. The device sensitivity correction coefficient for palladium was measured using a thin film of palladium with a thickness of 317 nm, and the device sensitivity coefficient for oxygen was measured using a sample prepared by forming $Ag_2O$ powder to a pellet of a thickness of 3 mm at a pressure of 700 kg/cm$^2$.

The measurement results are shown in Table 1.

TABLE 1

| | Composition (atom %) | |
|---|---|---|
| | Pd | O |
| Sample #1-1 | 81 | 19 |
| Sample #2-1 | 71 | 29 |
| Sample #3-1 | 63 | 37 |
| Sample #4-1 | 51 | 49 |
| Sample #5-1 | 39 | 61 |
| Comparative Sample #1-1 | 100 | 0 |

Sample #1 to Comparative Sample #1 were then successively set on the optical recording medium evaluation device, "DDU1000" (trade name), made by Pulstec Industrial Co., Ltd., and data were recorded in the recording layers of Sample #1 to Comparative Sample #1 under the following conditions. For data recording, the wavelength of the laser beam was 405 nm, the numerical aperture NA of an objective lens was set to 0.85, and the recording power Pw of the laser beam was set to 4 mW.

Furthermore, the recording power Pw of the laser beam was increased gradually from 4 mW in the range of 4 mW to 12 mW, and data were recorded by forming record marks of a length of 8T successively on the recording layers.

| | |
|---|---|
| Modulation method: | (1, 7) RLL |
| Recording line speed: | 5.3 m/sec |
| Channel bit length: | 0.12 μm |
| Channel clock: | 66 MHz |
| Recording method: | On-groove recording |

Then using the above-mentioned optical recording medium evaluation device, a laser beam, set to a reproduction power Pr, was successively illuminated on the recording layers of Sample #1 to Comparative Sample #1 to reproduce the data recorded in the recording layers and measure the degrees of modulation and the C/N ratios of the reproduction signals when the record marks with a length of 8T were reproduced. The C/N ratio of the reproduction signal was measured using the spectrum analyzer, "Spectrum Analyzer XK180" (trade name), made by Advantest Corp. Also, the degree of modulation of the reproduction signals was calculated as (La−Lb)/La. La is the level of a reproduction signal that is obtained by illumination of the laser beam on a region in which a record mark is not formed, and Lb is the level of a reproduction signal that is obtained by illumination of the laser beam on a region in which a record mark is formed.

For data reproduction, the wavelength of the laser was 405 nm, the numerical aperture NA of the objective lens was set to 0.85, and the reproduction power Pr of the laser beam was set to 0.3 mW.

The measurement results are shown in Table 2. Table 2 shows, for each sample, the recording power Pw, with which the maximum degree of modulation was obtained in reproducing the data that were recorded with the recording power Pw being varied in the range of 4 mW to 12 mW, and the degree of modulation and C/N ratio of the reproduction signal in the reproduction of the data recorded at the recording power Pw.

TABLE 2

|  | Pw (mW) | Degree of modulation (%) | C/N ratio (dB) |
|---|---|---|---|
| Sample #1 | 8 | 51.1 | 40.3 |
| Sample #2 | 8 | 47.4 | 41.5 |
| Sample #3 | 8 | 60.0 | 42.8 |
| Sample #4 | 6 | 63.8 | 41.0 |
| Sample #5 | 6 | 60.5 | 42.5 |
| Comparative Sample #1 | 12 | 40.8 | 38.5 |

As shown in Table 2, with each of Samples #1 to #5, the degree of modulation of the reproduction signal, obtained by reproducing the data recorded in the recording layer, was no less than 45%, clearly indicating that reproduction signals of an adequately high degree of modulation are obtained in comparison to Comparative Sample #1.

It can also be seen that, in comparison to Comparative Sample #1, the recording power Pw with the maximum degree of modulation is low each of Samples #1 to #5. Thus, these Samples have extremely high recording sensitivities.

Furthermore, with each of Samples #1 to #5, the C/N ratio of the reproduction signal, obtained by reproducing the data recorded in the recording layer, is no less than 40 dB, thus showing that reproduction signals of high C/N ratio are obtained in comparison to Comparative Sample #1.

Example 2

A storage test was executed by keeping Sample #1 to Comparative Sample #1, in which data were recorded, for 50 hours under an environment of 80° C. temperature and 85% relative humidity.

Then using the above-mentioned optical recording medium evaluation device, the data recorded in Sample #1 to Comparative Sample #1 that had been subject to the storage test were reproduced and the C/N ratios of the reproduction signals were measured. In measuring the C/N ratios of the reproduction signals, measurements were made for the data, among the data recorded in the recording layer, with which the highest degrees of modulation were obtained in Example 1.

The measurement results are shown in Table 3. In Table 3, the reproduction signal C/N ratios of Sample #1 to Comparative Sample #1 that were measured in Example 1 are indicated in the "Before storage test" column, and the reproduction signal C/N ratios of Sample #1 to Comparative Sample #1 after execution of the storage test are indicated in the "After storage test" column.

TABLE 3

|  | C/N ratio (dB) | |
|---|---|---|
|  | Before storage test | After storage test |
| Sample #1 | 40.3 | 41.1 |
| Sample #2 | 41.5 | 42.1 |
| Sample #3 | 42.8 | 42.0 |
| Sample #4 | 40.6 | 41.6 |
| Sample #5 | 42.5 | 43.6 |
| Comparative Sample #1 | 38.5 | 35.6 |

As shown in Table 3, with each of Samples #1 to #5, the reproduction signal C/N ratio, when data recorded in the recording layer are reproduced, hardly changed before and after the storage test, thus showing that these Samples have a high degree of reliability with respect to long-term storage.

Example 3

Sample #6 was prepared in the same manner as Sample #1 with the exception that the flow rates of Ar and $O_2$ in the mixed gas in the process of forming the recording layer were set to 50 sccm and 25 sccm, respectively.

Sample #6-1 was then prepared by forming a recording layer with a thickness of 200 nm on the surface of a silicon substrate with a thickness of 0.5 mm under the same film forming conditions as those for forming the recording layer of Sample #6.

Then using the above-mentioned fluorescence x-ray device, the respective contents of the palladium and oxygen contained in the recording layer of Sample #6-1 were measured. The contents of the palladium and oxygen contained in the recording layer were 47 atom % and 53 atom %, respectively.

Sample #7 was prepared in the same manner as Sample #1 with the exceptions that a second dielectric layer, with a thickness of 80 nm, was formed between the polycarbonate substrate and the recording layer by sputtering using a mixture target, having a ZnS to $SiO_2$ molar ratio of 80:20, and a first dielectric layer, with a thickness of 85 nm, was formed between the recording layer and the light transmitting layer in the same manner as the second dielectric layer.

Sample #8 was prepared in the same manner as Sample #7 with the exceptions that a reflecting layer, containing an alloy of Ag, Pd, and Cu and having a thickness of 100 nm, was formed between the polycarbonate substrate and the second dielectric layer, the thickness of the second dielectric layer was set to 15 nm, and the thickness of the first dielectric layer was set to 20 nm.

Then using the same optical recording medium evaluation device as the optical recording medium evaluation device used in Example 1, data were recorded by forming record marks of a length of 8T successively by laser beam illumination on the recording layers of Samples #6 to #8. In recording the data in the recording layers of Samples #6 to #8, the recording power Pw of the laser beam was set to 4 mW, 5 mW, and 5 mW, respectively.

Furthermore, using the same optical recording medium evaluation device, the data that were recorded in the recording layers of Samples #6 to #8 were reproduced and the noise contained in the reproduction signal and the reproduction signal C/N ratio in the reproduction of the record mark with a length of 8T were measured. In reproducing the data, the reproduction power Pr of the laser beam was set to 0.3 mW.

The measurement results are shown in Table 4.

TABLE 4

|  | Noise (dB) | C/N ratio (dB) |
|---|---|---|
| Sample #6 | −52.9 | 40.6 |
| Sample #7 | −55.29 | 44.1 |
| Sample #8 | −60.33 | 55.2 |

As shown in Table 4, in regard to the noise contained in the reproduction signal and the reproduction signal C/N ratio in the reproduction of the data recorded in the recording layer, the noise contained in the reproduction signal was lower and the reproduction signal C/N ratio was higher with Sample #7 than with Sample #6.

It was also found that in regard to the noise contained in the reproduction signal and the reproduction signal C/N ratio in the reproduction of the data recorded in the recording layer, the noise contained in the reproduction signal was lower and the reproduction signal C/N ratio was higher with Sample #8 than with Sample #7, and it has thus become clear that noise contained in reproduction signals can be lowered further and reproduction signals of higher C/N ratio can be obtained with Sample #8.

Example 4

Using the same optical recording medium evaluation device as the optical recording medium evaluation device used in Example 1, data were recorded by forming record marks of a length of 8T successively on the recording layers of Samples #1 to #5 and Comparative Sample #1 by illuminating Samples #1 to #5 and Comparative Sample #1 with the laser beam set to the recording powers Pw shown in Table 2.

Then using the optical film thickness measuring device, "ETA-RT" (trade name), made by STEAG ETA-OPTIK GmbH, a laser beam was illuminated on the recording layers of Samples #1 to #5 and Comparative Sample #1 to respectively measure the transmittance of a region in which the record mark was formed and the transmittance of a region in which the record mark was not formed. Then for each of Samples #1 to #5 and Comparative Sample #1, the percentage change of transmittance ΔT was calculated as ΔT=(Ta−Tb)/Ta. Here, Ta and Tb indicate the transmittance of a region in which the record mark was not formed and the transmittance of a region in which the record mark was formed, respectively.

The measurement results are shown in Table 5.

TABLE 5

|  | Transmittance (%) | | |
|---|---|---|---|
|  | Recorded region | Unrecorded region | Percentage change |
| Sample #1 | 29.3 | 34.1 | −16.4 |
| Sample #2 | 31.1 | 35.7 | −14.8 |
| Sample #3 | 40.1 | 43.7 | −9.0 |
| Sample #4 | 45.3 | 47.3 | −4.4 |
| Sample #5 | 56.3 | 55.1 | 2.1 |
| Comparative Sample #1 | 23.1 | 26.8 | −16.0 |

As shown in Table 5, with each of Samples #3 to #5, the transmittance of the recording layer prior to the forming of the record mark is no less than 40% and an adequately high transmittance is provided, and especially with Samples #4 and #5, the transmittance of the recording layer with respect to the laser beam prior to the forming of the record mark is no less than 45% and an even higher transmittance is provided.

Also with each of Samples #3 to #5, the percentage change of the transmittance with respect to the laser beam stayed within ±10%, that is, the transmittance of the recording layer did not change much before and after the forming of the record mark. Especially with Samples #4 and #5, the percentage change of the transmittance with respect to the laser beam stayed within ±5%, that is, the transmittance of the recording layer hardly changed before and after the forming of the record mark.

Example 5

First, a polycarbonate substrate was prepared in the same manner as Sample #1.

The polycarbonate substrate was then set on a sputtering device and, on a surface on which grooves and lands were formed, a reflecting layer, containing an alloy of Ag, Pd, and Cu as the main component and having a thickness of 100 nm, a second dielectric layer, having a mixture of ZnS and $SiO_2$ as the main component and having a thickness of 34 nm, a first recording film, having Cu as the main component, having 23 atom % of Al and 13 atom % of Au added, and having a thickness of 5 nm, a second recording film, having Si as the main component and having a thickness of 5 nm, and a first dielectric layer, having a mixture of ZnS and $SiO_2$ as the main component and having a thickness of 22 nm, were formed successively by sputtering to thereby form a first recording layer. In forming the first dielectric layer and the second dielectric layer, a mixture target, with a ZnS to $SiO_2$ molar ratio of 80:20, was used.

The polycarbonate substrate on which the first recording layer was formed was then set on a spin coating device, and while rotating the polycarbonate substrate, an ultraviolet-curing acrylic resin was coated to form a coating film on the first recording layer. A stamper, on which grooves and lands are formed, was then set on the surface of the coating film, ultraviolet rays were illuminated onto the coating film across the stamper to cure the ultraviolet-curing acrylic resin, and the stamper was then removed. An intermediate layer having a thickness of 25 μm and grooves and lands formed on the surface thereof at a groove pitch of 0.32 μm was thus formed.

The polycarbonate substrate on which the intermediate layer was formed was furthermore set on a sputtering device, and under a mixed gas atmosphere, wherein the flow rates of Ar and $O_2$ were set to 10 sccm and 90 sccm, respectively, sputtering was performed using a Pd target to form a second recording layer, containing palladium oxide as the main component and having a thickness of 20 nm.

Lastly, an ultraviolet-curing acrylic resin was coated by spin coating to form a coating film on the surface of the second recording layer and this was subject to ultraviolet ray illumination to form a light transmitting layer of 75 μm.

A Sample #9 was thus prepared.

A Sample #10 was prepared in the same manner as Sample #9 with the exceptions that the flow rates of Ar and $O_2$ in the mixed gas in the process of forming the second recording layer were set to 50 sccm and 20 sccm, respectively, and the thickness of the second recording layer was set to 15 nm.

A Sample #11 was prepared in the same manner as Sample #9 with the exceptions that the flow rates of Ar and $O_2$ in the mixed gas in the process of forming the second recording layer were set to 50 sccm and 5 sccm, respectively, and the thickness of the second recording layer was set to 10 nm.

Samples #9-1 to #11-1 were then prepared by forming a recording layer with a thickness of 200 nm on the surface of a silicon substrate with a thickness of 0.5 mm under the same film forming conditions as those for forming the second recording layers of Samples #9 to #11, respectively.

Furthermore, using the above-mentioned fluorescence X-ray device, the contents of the palladium and oxygen contained in the recording layers of Samples #9-1 to #11-1 were measured in the same manner as in Example 1.

The measurement results are shown in Table 6.

TABLE 6

| | Composition (atom %) | |
|---|---|---|
| | Pd | O |
| Sample #9-1 | 39 | 61 |
| Sample #10-1 | 51 | 49 |
| Sample #11-1 | 71 | 29 |

Then using the above-mentioned optical recording medium evaluation device, data were recorded by illuminating a laser beam, set to a recording power Pw, onto the first recording layers of Samples #9 to #11 to form record marks of a length of 8T on the first recording layers. In recording the data, the recording power Pw of the laser beam was set to 4 mW.

Furthermore, the recording power Pw of the laser beam was increased gradually from 4 mW in the range of 4 mW to 12 mW, and data were recorded successively in the first recording layers of Samples #9 to #11.

Then using the same optical recording medium evaluation device, a laser beam set to a reproduction power Pr was successively illuminated on the first recording layers of Samples #9 to #11 to reproduce the data recorded of the reproduction signal in the first recording layers and measure the degrees of modulation in the reproduction of the record marks with a length of 8T. In reproducing the data, the reproduction power Pr of the laser beam was set to 0.7 mW.

The measurement results are shown in Table 7. In the "Recording power Pw" column of Table 7 are indicated the lowest recording powers Pw, among recording powers Pw for which a degree of modulation of no less than 60% was obtained in the reproduction of the data recorded with the recording power Pw being varied in the range of 4 mW to 12 mW.

TABLE 7

| | Pw (mW) |
|---|---|
| Sample #9 | 9.0 |
| Sample #10 | 9.5 |
| Sample #11 | 10.5 |

Samples #9 to #11 were then successively set on the same optical recording medium evaluation device and data were recorded by forming record marks of a length of 8T by illuminating a laser beam, set to a recording power Pw, onto the second recording layers. In recording the data in the second recording layers of Samples #9 to #11, the recording power Pw of the laser beam was set to 6 mW, 6 mW, and 8 mW, respectively.

Furthermore with each of Samples #9 to #11, the same optical recording medium evaluation device was used to record data in the first recording layer by forming a record mark of a length of 8T by illuminating a laser beam, set to a recording power Pw, on the first recording layer via the region of the second recording layer in which data were recorded. In recording the data, the recording power Pw of the laser beam was increased gradually in the range of 4 mW to 12 mW.

Furthermore with each of Samples #9 to #11, the same optical recording medium evaluation device was used to illuminate a laser beam, set to a reproduction power Pr, onto the first recording layer via the region of the second recording layer in which data were recorded to reproduce the data recorded in the first recording layer and measure the degree of modulation of the reproduction signal in the reproduction of the record mark with a length of 8T. In reproducing the data recorded in the first recording layer of each of Samples #9 to #11, the reproduction power Pr of the laser beam was set to 0.7 mW.

The measurement results are shown in Table 8. In the "Recording power Pw" column of Table 8 are indicated the lowest recording powers Pw, among recording powers Pw for which a degree of modulation of no less than 60% was obtained in the reproduction of the data recorded with the recording power Pw being varied in the range of 4 mW to 12 mW.

TABLE 8

| | Pw (mW) |
|---|---|
| Sample #9 | 9.0 |
| Sample #10 | 9.0 |
| Sample #11 | 9.0 |

As shown in Tables 7 and 8, with each of Samples #9 and #10, the recording power Pw, at which a degree of modulation of no less than 60% was obtained, hardly changed before and after the recording of data in the second recording layer, thus showing that even after recording data in the second recording layer, data can be recorded in the first recording layer at conditions equivalent to those prior to recording data in the second recording layer.

This invention is not restricted to the above-described embodiments and examples, various modifications are possible within the scope of the invention as indicated by the claims, and needless to say, such modifications fall within the scope of this invention.

For example, though with the embodiment shown in FIG. 3, optical recording medium 200 comprises supporting substrate 11, light transmitting layer 13, and first recording layer 20 and second recording layer 30, formed between supporting substrate 11 and light transmitting layer 13, this invention is not limited to optical recording media having two recording layers and may be applied widely to optical recording media having two or more recording layers.

Also, though with the embodiment shown in FIG. 3, second recording layer 30 is arranged from a single recording layer, this invention is not limited thereto, and as with first recording layer 20, second recording layer 30 may be arranged so as to include a dielectric layer, reflecting layer, etc.

Also, though with the embodiment shown in FIG. 3, first recording layer 20 comprises first recording film 23a, containing Cu as the main component, and second recording film 23b, containing Si as the main component, first recording layer 20 does not necessarily have to be formed so as to have first recording film 23a, containing Cu as the main component, and second recording film 23b, containing Si as the main component, and first recording layer 20 may instead be formed so as to contain palladium oxide as the main component.

Also, though with the embodiment shown in FIG. 3, first recording layer 20 is arranged as a write-once type recording layer comprising first recording film 23a, containing Cu as the main component, and second recording film 23b, containing Si as the main component, this invention is not limited thereto and first recording layer 20 may instead be arranged as a reproduction-only recording layer or a rewritable type recording layer. For example, in the case where first recording layer 20 is to be arranged as a reproduction-only recording layer, supporting substrate 11 or intermediate layer 40 functions as the recording layer furthest from the light incidence surface and data are recorded by means of pits that are formed by indentations and protrusions of a stamper on the surface of supporting substrate 11 or intermediate layer 40.

Furthermore, though with the embodiments shown in FIGS. 1 to 3, optical recording media 10, 100, 200 are equipped with a light transmitting layer 13, a hard coat layer, containing a hard coat composition as the main component, may be provided in place of light transmitting layer 13 or on the surface of light transmitting layer 13. Furthermore, in order to add a lubricating property and an antifouling property, the hard coat layer may be made to contain a lubricant or a lubricating layer, containing a lubricant as the main component, may be provided separately on the surface of the hard coat layer.

What is claimed is:

1. An optical recording medium, comprising: a substrate; and at least a recording layer, formed on the substrate; and wherein the recording layer contains palladium oxide as the main component and contains oxygen at an amount of 19 atom % to 61 atom %;

wherein a plurality of the recording layers are provided and the recording layers are separated by at least an intermediate layer on the substrate, and at least one of the recording layers, besides the recording layer furthest from a light incidence surface for a laser beam, contains palladium oxide as the main component and contains oxygen at an amount of 37 atom % to 61 atom %.

2. The optical recording medium according to claim 1, wherein at least one dielectric layer is formed adjacent the recording layer.

3. The optical recording medium according to claim 1, wherein at least one dielectric layer is formed adjacent at least one of the recording layers besides the recording layer furthest from the light incidence surface for the laser beam.

4. The optical recording medium according to claim 3, wherein the recording layer furthest from the light incidence surface for the laser beam comprises a first recording film, containing Cu as the main component, and a second recording film, containing Si as the main component.

5. The optical recording medium according to any of claims 1, 2, 3, and 4, wherein the recording layer is arranged for the recording of data and the reproduction of recorded data using a laser beam with a wavelength of 380 nm to 450 nm.

* * * * *